JAMES E. WEAVER.
Improvement in Article of Food or Pearl Wheat.
No. 122,543.
Patented Jan. 9, 1872.
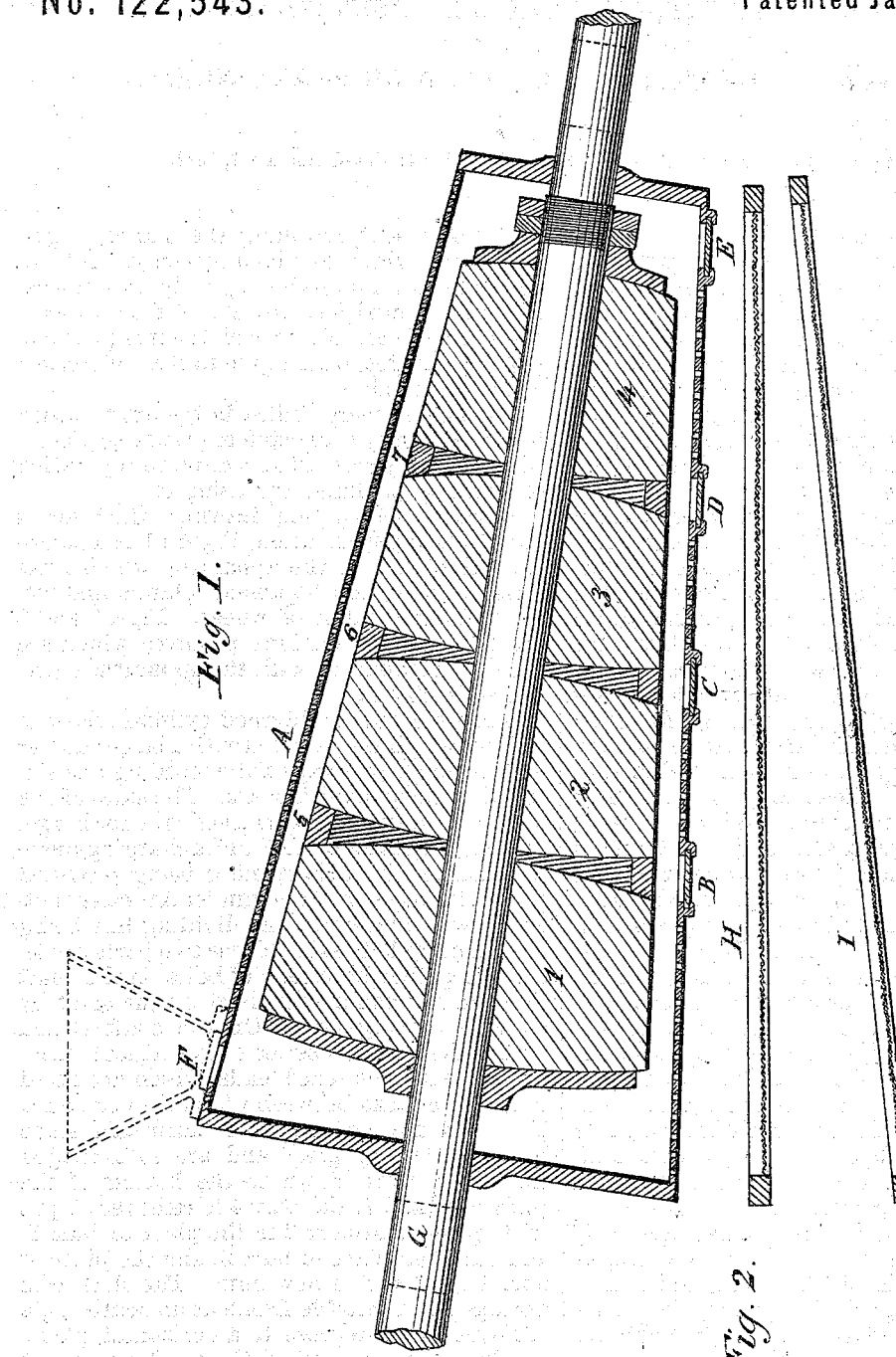

122,543

UNITED STATES PATENT OFFICE.

JAMES E. WEAVER, OF HAVELOCK, PENNSYLVANIA.

IMPROVEMENT IN ARTICLES OF FOOD OR PEARL WHEAT.

Specification forming part of Letters Patent No. 122,543, dated January 9, 1872.

*To all whom it may concern:*

Be it known that I, JAMES E. WEAVER, of Havelock, in the county of Washington and State of Pennsylvania, have invented or discovered a certain new and useful improvement, viz: a new article of manufacture and diet which I call "Pearl Wheat;" and I do hereby declare that the following is a full, clear, and exact description thereof, reference being had to the accompanying drawing and the letters of reference marked thereon.

The constituents of a grain of wheat consist of about ten parts of water, about two parts of gum, about four parts of sugar, about seventy-two parts of starch, and about twelve parts of gluten, combined with the tegument which incloses the whole. It is well known that if the tegument of a grain of wheat is broken so as to expose the pellicle of gluten which incloses the water, gum, sugar, and starch to the action of the oxygen of the air, fermentation follows, and the whole body becomes sour and unsuitable food for man. Roasted grains of wheat and bread made from unbolted wheat flour, (known as "brown bread" and as "Graham bread,") have been and are now considered a very wholesome diet by many physicians, and, therefore, recommended by them to persons afflicted with dyspepsia, constipation, and other derangements of the animal economy; but the scientific and observing physician knows that the use of such diet is often injurious to persons so afflicted, and in no case so healthful as good bread made from bolted wheat flour. The gluten or gliadine of the wheat consists of saline particles crystallized, which are insoluble except by diluted hydrochloric or acetic acid (or their equivalent) heated to about 100° Fahrenheit; that the gastric juice of the human stomach cannot dissolve these translucent and crystallized particles, which become coagulated and soured in the stomach, and in this form pass off through the intestines, often causing inflammation of the mucous membrane, which is frequently followed by an inverted action of the lacteal vessels whereby a heavy exhaustive drain is made on the whole organism in the form of a wasting diarrhea. Now my invention or discovery consists in separating, in the manner hereinafter described, the tegument, (bran,) gluten, and water, from the grains of wheat, retaining the starch, sugar, and gum, (which is about seventy-eight per cent. of the whole,) whereby I obtain a farinaceous and nutritious article of food which I call pearl wheat. This pearl wheat is put up in paper packages, which give to it an increased commercial value.

To enable others skilled in the art to which it is most nearly connected to prepare my pearl wheat, I will proceed to describe the operation of pearling, packing, and using it.

In the accompanying drawing, which forms part of my specification, Figure 1 is a longitudinal section of the apparatus which I use for separating the tegument, gluten, and water, from the grains of wheat. Figs. 2 and 3 are longitudinal sections of sieves which are used in combination with the apparatus represented in Fig. 1.

A represents a coniformed cylinder, the side walls of which are provided with a large number of very small openings not exceeding one-sixteenth of an inch in diameter. The sides of the cylinder are provided with a series of discharge-openings, marked B C D E, and a charging-opening, marked F, each opening being provided with a sliding door. The cylinder A is constructed in two equal parts, the dividing line being on a plane with its axis. These two parts are secured together by means of bolts on the shaft G, so that it can be revolved on the shaft by suitable driving gear. On the shaft G and within the case is a series of cylindrical burrs, 1 2 3 4, with convexed ends, which are fitted to concave disks between which they are held. The burrs are constructed of hard sand-stone having a "sharp grit," and are so arranged that when worn down to the bottom of the rings 5, 6, and 7, the burr 4 is removed, 3 put in its place, and burr 2 in the place of burr 3, and burr 1 in place of burr 2, and the place of burr 1 filled with a new burr. The shaft G is arranged in a suitable frame at an acute angle of about three degrees to a horizontal plane. The burrs at one end of the shaft are about twenty-four inches in diameter, and at the other end about twelve inches in diameter. The whole length of all the burrs combined is about four feet. The space between the ends of the case A and the ends of the burrs 1 and 4 is about three inches wide, and the space between the perforated sides of the burrs is about one inch. The case A is so arranged that it may be moved lengthwise on the shaft for the purpose of diminishing the space between the surface of the burrs and the perforated sides of the case A. The burrs are revolved at a speed of about seven hundred revolutions per minute, and the case A is revolved at a speed of fifty revolutions per minute, both the case and the burrs revolving in the same direction. Under the case A are arranged sieves H and I, each being slightly inclined in opposite directions with relation to each other. The case A is filled with wheat at the opening F, which is then closed; the case and burrs are then revolved at the speed hereinbefore stated for about ten minutes, which will be sufficient time to cut the tegument and gluten from the grains of wheat, and the great speed of the burrs, combined with the motion of the case A and the friction of the grains of wheat rubbing against each other, will heat them to about 250° Fahrenheit, which will free them from the water, which, in the form of a gaseous vapor, will pass off through the small openings in the sides of the case A. The apertures B C D E are then opened and the pearled wheat discharged from the case A into the sieve H, which is used for separating the wheat from the tegument, gluten, and the fine particles of the starch which may be cut from the grains of wheat, which, passing down on the inclined sieve H drops upon the sieve I, and thus it may travel from one sieve to another below it until the whole grains of wheat are perfectly freed from all the loose matter mixed with it. The pearled wheat is then put up in paper packages each containing about two and one-half pounds.

Wheat treated, prepared, and put up in paper packages, as herein described, will keep for any desired length of time, and as an article of food is suitable for persons of any age, either sick or well, for it is freed from all those things which are liable to produce undue excitement in, or unhealthy action of the stomach; but on the contrary furnishes an article of diet which is farinaceous and nutritious, which will absorb the acrid secretions of the stomach and promote a healthy action of that organ. It also places within the reach of all a cheap article for jellies, puddings, and diet for common table use. In cooking my new article of manufacture hereinbefore described, I take three pints of water and one-half pound of the wheat, and boil it until the grains are about to form into a jelly. It is then removed from the fire, dished up, and served with cream and sugar. Other modes of cooking and preparing it for table use I leave to the good housewife and skillful cook.

I have described the apparatus used for pearling sufficiently clear to enable others to prepare the wheat, but have not described the details of construction, nor the advantages of the machine represented in the accompanying drawing, for I propose making it the subject of another application for Letters Patent, in which I will give a full, clear, and exact description of the said apparatus and its advantages.

I am aware that wheat has been freed from its tegument (bran) prior to grinding it into flour, and that in thus hulling it a portion of its gluten or gliadine may have been cut from it. I therefore do not claim, broadly, the hulling of wheat or freeing it from its tegument, but—

What I do claim in counterdistinction to such hulling, is—

A new article of manufacture and diet, viz: grains of wheat freed from their tegument, gluten and water, retaining only their starch, sugar, and gum, and putting the said grains of wheat up in paper packages whereby their quality and commercial value are increased, substantially as hereinbefore described, and for the purpose set forth.

JAMES E. WEAVER.

Witnesses:
JAMES J. JOHNSTON,
EDM. F. BROWN. (57)